Figure 1:
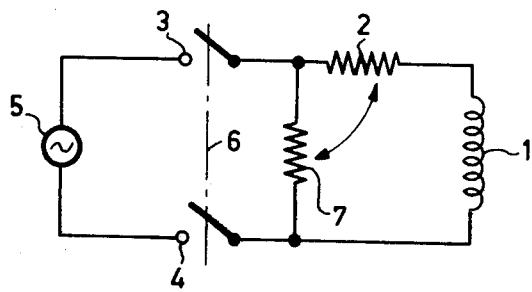

United States Patent [19]  
Belhomme

[11] 4,024,427  
[45] May 17, 1977

[54] DEGAUSSING CIRCUIT

[75] Inventor: Charles Belhomme, Brussels, Belgium

[73] Assignee: U.S. Philips Corporation, New York, N.Y.

[22] Filed: Nov. 20, 1975

[21] Appl. No.: 633,576

[30] Foreign Application Priority Data
Dec. 16, 1974 Netherlands ............... 7416329

[52] U.S. Cl. ................................ 315/8; 338/22 R; 338/23; 361/150
[51] Int. Cl.² .................. H01F 13/00; H01C 7/02
[58] Field of Search ............................. 315/8, 85; 317/157.5 TV; 338/22 R, 205, 23

[56] References Cited  
UNITED STATES PATENTS

| | | | |
|---|---|---|---|
| 3,492,543 | 1/1970 | Muranaga | 317/157.5 TV |
| 3,619,703 | 11/1971 | Yamashita et al. | 315/8 |
| 3,845,442 | 10/1974 | Ihaya et al. | 338/23 |

Primary Examiner—Eugene R. LaRoche  
Attorney, Agent, or Firm—Frank R. Trifari; Henry I. Steckler

[57] ABSTRACT

A degaussing circuit, for example for a color television receiver, in which the degaussing coil is in series with a PTC-thermistor and in which the series arrangement thus formed is in parallel across a second PTC thermistor and across an a.c. voltage source, for example the supply mains. The thermistors are thermally coupled.

7 Claims, 4 Drawing Figures

DEGAUSSING CIRCUIT

The invention relates to degaussing circuit comprising the series arrangement of degaussing coil and of a thermistor having a positive temperature coefficient, with means for connecting the said series arrangement to the terminals of an a.c. voltage source and with a resistive element for heating the thermistor.

Such a circuit which can, for example be used for degaussing the inner shield and the shadow mask of shadow mask colour television tubes is known from German Patent Specification No. 1,282,679. In order to reduce the current flowing through the degaussing coil at the end of the process, which current would produce undesired residual magnetism in the ferromagnetic parts to be degaussed, the thermistor is raised by means of the resistive element to a higher temperature than the temperature which would be produced by the final current alone, for this results in a further increase of the resistance value of the thermistor.

In the known circuit a wire-wound resistor of a high permissible power may in practice be used as resistive element, which is placed in the immediate vicinity of the thermistor. However, the disadvantage of this measure is that the temperature of the wire-wound resistor cannot be well controlled so that the difference between the maximum permissible temperature of the thermistor and the ambient temperature cannot be controlled with certainty. Consequently the risk for overheating which may destroy the thermistor is not precluded. For this reason this circuit is no longer used.

It is an object of the invention to prevent the disadvantage of the known circuit and to that end the circuit according to the invention is characterized in that the resistive element is a second thermistor having a positive temperature coefficient which can be connected to the terminals of the a.c. voltage source and which is thermically coupled with the first thermistor.

Due to heat transfer from the second to the first thermistor the latter indeed reaches a higher temperature. However, this results in a stable state whereafter the temperature can no longer appreciably increase so that the circuit according to the invention is safe. It will be observed that degaussing circuits having two thermically-coupled thermistors are known in itself. The publication Philips Product Information 43: "Magnetic Shielding and Automatic Degaussing of Shadow-mask Tubes" dated 27th January 1972 describes such a circuit, in which, however, the second thermistor is not connected to the terminals of the a.c. voltage source but is connected in series with the first thermistor and in which a parallel resistor of high permissible power is used, which resistor is an expensive component. Thanks to the measure according to the invention such a resistor can be dispensed with.

The invention also relates to a composite thermistor element for use in a degaussing circuit, comprising a first and a second thermistor having a positive temperature coefficient which are thermically coupled and which is characterized in that the resistance value of the second thermistor at a higher temperature than the highest Curie point is lower than the resistance value of the first thermistor at the same temperature.

Figure 2:
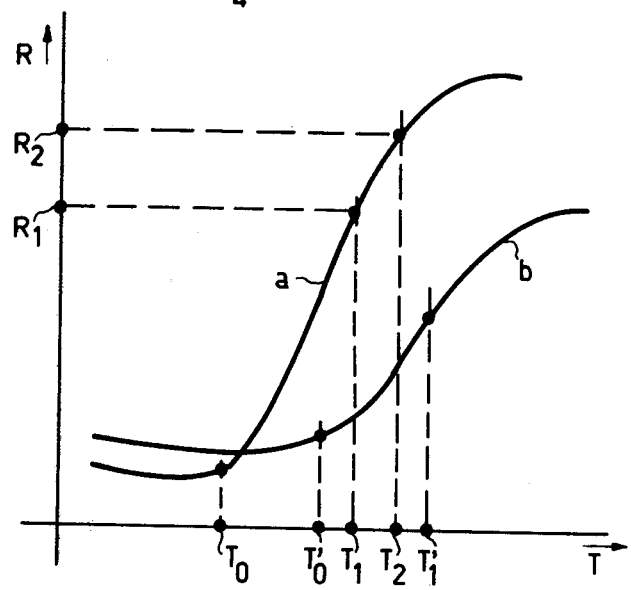
Figure 3:
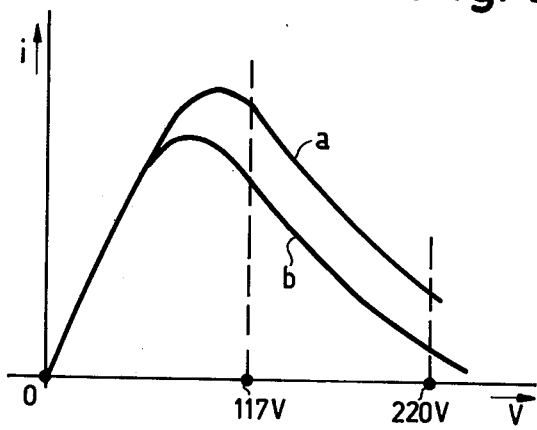
Figure 4:
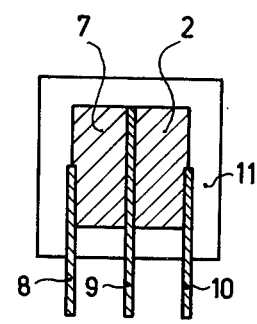

The invention will be further explained with reference to the accompanying figures which are given by way of non-limitative example, in which FIG. 1 shows the circuit according to the invention FIGS. 2 and 3 show characteristic curves to elucidate the invention and FIG. 4 shows a thermistor element according to the invention.

In FIG. 1 a degaussing coil 1 of, for example, a colour television picture tube of the shadow mask type not shown here, is connected in series with a thermistor 2 having a positive temperature coefficient. The series arrangement formed in this way is connected to the terminals 3 and 4 of an a.c. voltage source 5, for example the electric supply mains via a switch 6. A second thermistor 7 also having a positive temperature coefficient is in parallel with the series arrangement of coil 1 and thermistor 2. The thermistors are thermically coupled as they have been brought into intimate contact with one another which is shown in FIG. 1 by means of an arrow.

In the cold state the two thermistors have relatively low resistance values. Immediately after mains switch 6 has been switched on large currents flow therefore through both branches of the circuit. The current through coil 1 has a starting amplitude of approximately 5A or more. Because thermistor 7 is in parallel with source 5 the current therethrough is independent of the degaussing current which flows through the branch 1, 2. Both currents are able to heat the thermistors in a relatively short time (approximately 10s).

In FIG. 2 the resistance value R of thermistor 2 (curve $a$) and of thermistor 7 (curve $b$) has been plotted on a logarithmic scale as a function of the temperature T. Above the so-called Curie point $T_o$ (approximately 75° C) the resistivity of the material from which thermistor 2 has been made and consequently also its resistance value increases very steeply. Owing to internal heating thermistor 2 would, in the absence of thermistor 7, obtain a temperature $T_1$ (approximately 130° C) with a corresponding resistance value $R_1$ of approximately 25 k$\Omega$, whereby the amplitude of the degaussing current attains a value of approximately 8 mA.

FIG. 2 shows that thermistor 7 is chosen such that it has a higher Curie point $T_o'$ (approximately 120° C) than thermistor 2. This implies that $T_o'$ is attained at a later instant than that at which thermistor 2 reaches temperature $T_o$. Thermistor 7 gets warm less quickly than thermistor 2. After a certain time after the temperature $T_o$ has been reached the current through thermistor 2 becomes that small that the decrease of the factor $i^2$ in the expression $i^2R$ of the dissipated power dominates the increase in the factor R. This power becomes smaller than the power dissipated by thermistor 7. Consequently thermistor 7 delivers heat to thermistor 2. As a part of the heat radiated by thermistor 7 is still absorbed by the surroundings, the temperature of thermistor 2 will be lower than that of the thermistor 7. From the above it appears that thermistor 7 only affects the degaussing current after a certain period of time.

Thermistor 7 reaches a temperature $T'_1$, which in a practical circuit is approximately 50° C higher than $T_1$, so that thermistor 2 reaches, by means of heat transfer a final temperature $T_2$ which exceeds $T_1$ by approximately 20° to 30° C. A stable state occurs in which the final temperature of thermistor 7 is slightly lower than $T'_1$ and in which both thermistors are kept at approximately the said final temperatures by the final currents. This state is stable and consequently safe: For, an increase in the temperature produces a decrease of the current which opposes the increase in the temperature.

This also prevents that the temperature rises too high which might cause the resistance value to decrease. The final value $R_2$ of thermistor 2 is higher than $R_1$, namely approximately 200 k$\Omega$ and the final amplitude of the current through coil 1 is reduced to the desired value, i.e. approximately 1 mA.

In FIG. 3 the current $i$ through thermistor 2 is plotted versus the voltage $v$ across it. Curve $a$ holds for a lower ambient temperature than curve $b$. Due to thermistor 7 the ambient temperature of thermistor 2 becomes higher and it appears from FIG. 3 that current $i$ is indeed reduced. A condition herefor is that the power dissipated by thermistor 7 in the final state due to internal heating is higher than that of thermistor 2, which means that the final value of the resistance of thermistor 7 is lower than that of thermistor 2, which also appears from FIG. 2. For this the dissipation in coil 1 in the final state is assumed to be negligibly small with respect to that in thermistor 2. This is justified by the fact that the ohmic resistance value of coil 1 is much smaller than value $R_2$ (approximately 20 $\Omega$ as compared with approximately 200 k$\Omega$) so that the output voltage drop across coil 1 is negligibly small.

As compared with the case where thermistor 7 is a linear resistor the circuit according to the invention means a considerable saving in energy. For the final value of the current through thermistor 7 is that small that the power dissipated hereby is many times smaller than that produced by the substantially constant current which flows through the linear resistor. An additional saving is obtained by choosing for thermistor 7 a type which has a higher initial value of approximately 1 k$\Omega$ i.e. in the cold condition, than thermistor 2, which is about 25 to 40 $\Omega$. For the initial value of thermistor 2 is determined by the desired magnitude of the initial amplitude of the degaussing current and must consequently be small.

A saving in costs is obtained as compared to the circuit described in the above publication, which also includes a linear resistor. Furthermore the price of the component formed by thermistors 2 and 7 is not higher than the corresponding component of the known circuit. FIG. 4 is a diagrammatic drawing of the "dual PTC" (PTC = positive temperature coefficient) according to the invention. The component consists of two disks 2 and 7 of PTC material, for example barium titanate, which are clamped between three spring-fitted contacts 8, 9 and 10 and which are encapsulated in a case 11, made of synthetic material. In FIG. 1 contact 9 corresponds with the junction of the two thermistors, whilst reference 8 is the connection shown in FIG. 1 at the bottom of thermistor 7 and reference 10 the connection shown at the right of thermistor 2. As both thermistors must be able to withstand the mains voltage they are of substantially the same thickness, whilst the "dual PTC" of the known circuit consists of a thin and a thick thermistor. The sintering costs of the thick thermistors are slightly lower, which approximately compensates the higher costs of material.

A higher Curie point for thermistor 7 is obtained by replacing barium in the PTC-material by lead. A lower Curie point for thermistor 2 can be obtained by replacing barium by strontium.

It will be clear that the described circuit can also be used for other purposes than degaussing ferromagnetic parts in a colour television receiver. Other applications are possible, for example degaussing tools or erasing magnetic tapes for tape recording- and -reproducing devices.

What is claimed is:

1. A degaussing circuit comprising the series arrangement of a degaussing coil and a first thermistor having a positive temperature coefficient, only a second thermistor having a positive temperature coefficient thermically coupled to the first thermistor and electrically parallel coupled to said series arrangement, both of said thermistors having different Curie points, means for applying an alternating current voltage to said thermistors, said voltage being substantially the same a substantial time after said application, the resistance value of the second thermistor at a higher temperature than the highest of the Curie points being lower than the resistance value of the first thermistor at the same temperature, and the resistance value of the second thermistor before said alternating current voltage is applied being higher than the resistance value of the first thermistor.

2. A circuit as claimed in claim 1, wherein the Curie point of the second thermistor exceeds the Curie point of the first thermistor.

3. A colour television receiver comprising, a picture display tube of the shadow mask type and a degaussing circuit as claimed in claim 1.

4. A composite thermistor element for use in a degaussing circuit, comprising first and second thermically coupled thermistors, each having a positive temperature coefficient, both of said thermistors having different Curie points, the resistance value of the second thermistor at a higher temperature than the highest of the Curie points being lower than the resistance value of the first thermistor at the same temperature, the resistance value of the second thermistor before said alternating current is applied being higher than the resistance value of the first thermistor.

5. A thermistor element as claimed in claim 4, wherein the Curie point of the second thermistor exceeds the Curie point of the first thermistor.

6. A thermistor element as claimed in claim 5, wherein the molecule of the material from which the second thermistor consists contains more lead than the molecule of the material from which the first thermistor consists.

7. A thermistor element as claimed in claim 5, wherein the molecule of the material of which the first thermistor comprises contains more strontium than the molecule of the material of which the second thermistor comprises.

* * * * *